(12) United States Patent
Chastek et al.

(10) Patent No.: US 12,031,063 B2
(45) Date of Patent: Jul. 9, 2024

(54) ADHESIVE COMPOSITIONS, ASSEMBLIES, AND METHODS THEREOF

(71) Applicant: 3M INNOVATIVE PROPERTIES COMPANY, St. Paul, MN (US)

(72) Inventors: Thomas Q. Chastek, St. Paul, MN (US); Robert D. Waid, Maplewood, MN (US); Mark E. Napierala, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 721 days.

(21) Appl. No.: 17/051,330

(22) PCT Filed: Jun. 25, 2019

(86) PCT No.: PCT/IB2019/055344
§ 371 (c)(1),
(2) Date: Oct. 28, 2020

(87) PCT Pub. No.: WO2020/003123
PCT Pub. Date: Jan. 2, 2020

(65) Prior Publication Data
US 2021/0130662 A1    May 6, 2021

Related U.S. Application Data

(60) Provisional application No. 62/690,837, filed on Jun. 27, 2018.

(51) Int. Cl.
*C09J 153/02* (2006.01)
*C08K 7/28* (2006.01)
(Continued)

(52) U.S. Cl.
CPC .............. *C09J 153/02* (2013.01); *C09J 7/387* (2018.01); *C09J 11/04* (2013.01); *C08K 7/28* (2013.01);
(Continued)

(58) Field of Classification Search
CPC .. C09J 7/387; C09J 153/02; C09J 133/00–26; C09J 171/02
See application file for complete search history.

(56) References Cited

U.S. PATENT DOCUMENTS

| 3,257,357 A | 6/1966 | Stamatoff |
| 3,257,358 A | 6/1966 | Stamatoff |

(Continued)

FOREIGN PATENT DOCUMENTS

| EP | 3243886 | 11/2017 |
| WO | WO 1990-014397 | 11/1990 |

(Continued)

OTHER PUBLICATIONS

"Thermal transitions of homopolymers: Glass transition and melting point" Polymer Products from Aldrich, pp. 52-53, (2016).

(Continued)

*Primary Examiner* — Kregg T Brooks
*Assistant Examiner* — David R. Foss
(74) *Attorney, Agent, or Firm* — Philip P. Soo (57) ABSTRACT

Described are adhesive compositions containing a block copolymer component that includes a midblock segment and a plurality of end block segments, each end block segment comprising polystyrene, a (meth)acrylic functional additive having a glass transition temperature of from 50° C. to 160° C., a first tackifier compatible with the midblock segment and containing a hydrocarbon, and a second tackifier compatible with the end block segments and containing a polyphenylene ether. These compositions are useful in pro- (Continued)

viding pressure-sensitive adhesives that are melt processible, display a high temperature resistance, and effectively bond to low surface energy substrates.

12 Claims, 2 Drawing Sheets

(51) Int. Cl.
 *C09J 7/38* (2018.01)
 *C09J 11/04* (2006.01)
 *C09J 133/08* (2006.01)
 *C09J 133/10* (2006.01)
 *C09J 171/02* (2006.01)

(52) U.S. Cl.
 CPC ............ *C09J 133/08* (2013.01); *C09J 133/10* (2013.01); *C09J 171/02* (2013.01)

(56) References Cited

U.S. PATENT DOCUMENTS

| | | |
|---|---|---|
| 3,306,874 A | 2/1967 | Hay |
| 3,306,875 A | 2/1967 | Hay |
| 4,141,876 A | 2/1979 | Hansen |
| 4,314,926 A | 2/1982 | Allison, III |
| 5,393,787 A | 2/1995 | Nestegard |
| 6,277,488 B1 | 8/2001 | Kobe |
| 9,920,222 B2 | 3/2018 | Das |
| 2003/0001195 A1 | 1/2003 | Mori |
| 2003/0190468 A1 | 10/2003 | Khandpur |
| 2011/0104486 A1 | 5/2011 | Ma |
| 2014/0037955 A1* | 2/2014 | Kamoi ............... C09J 7/22 524/267 |
| 2014/0377533 A1* | 12/2014 | Waid ............... C09J 7/26 525/89 |
| 2015/0037559 A1 | 2/2015 | Dollase |

FOREIGN PATENT DOCUMENTS

| | | |
|---|---|---|
| WO | WO 2000-024840 | 5/2000 |
| WO | WO 2013-074446 | 5/2013 |
| WO | WO 2014-186169 | 11/2014 |
| WO | WO 2018-116067 | 6/2018 |

OTHER PUBLICATIONS

"Encyclopedia of Polymer Science and Engineering", Wiley-Interscience Publishers, 1988, vol. 13, Table of contents, 3pages.
"Encyclopedia of Polymer Science and Technology", 1964, vol. 1, Interscience Publishers, Table of contents, 5pages.
Satas, "Hand book of pressure sensitive adhesive technology", 1989, 2nd ed., pp. 172.
International Search report for PCT International Application No. PCT/IB2019/055344 mailed on Dec. 13, 2019, 4 pages.

* cited by examiner

ADHESIVE COMPOSITIONS, ASSEMBLIES, AND METHODS THEREOF

CROSS REFERENCE TO RELATED APPLICATIONS

This application is a national stage filing under 35 U.S.C. 371 of PCT/IB2019/055344, filed Jun. 25, 2019, which claims the benefit of U.S. Provisional Patent Application No. 62/690,837, filed Jun. 27, 2018, the disclosures of which are incorporated by reference in their entirety herein.

FIELD OF THE INVENTION

Described herein are adhesive compositions, adhesive assemblies and methods of making and using the same. The provided adhesive compositions are particularly useful in pressure-sensitive adhesives.

BACKGROUND

Pressure-sensitive adhesives ("PSAs") are adhesives that are normally tacky at room temperature and can be adhered to a substrate surface by application of light pressure. No solvent, water, or heat is needed to activate the adhesive. Characteristics of pressure-sensitive adhesives are described in the Encyclopedia of Polymer Science and Engineering, Vol. 13, Wiley-Interscience Publishers (New York, 1988) and Encyclopedia of Polymer Science and Technology, Vol. 1, Interscience Publishers (New York, 1964). Conventionally, a pressure-sensitive adhesive meets the Dahlquist criterion described in DONATAS SATAS, HANDBOOK OF PRESSURE-SENSITIVE ADHESIVE TECHNOLOGY, $2^{nd}$ ed., p. 172 (1989). This criterion defines a pressure-sensitive adhesive as one having a one-second creep compliance of greater than $1 \times 10^{-6}$ cm$^2$/dyne at its service temperature (for example, at temperatures in a range of from 15° C. to 35° C.).

Pressure-sensitive adhesives can be prepared by compounding an elastomer and a suitable tackifier, such as a rosin ester. Known elastomers include styrenic block copolymers, which include a polymerized glassy styrene block and a polymerized rubbery block (e.g., polyisoprene). At ambient temperatures, the styrenic block and the rubbery block microphase separate into discrete but connected domains to produce an elastomeric structure that is thermally reversible. Radial styrenic block copolymers are a subset of styrenic block copolymers where the elastomer has a multi-arm, rather than a linear structure.

The addition of a tackifier can convert a styrenic block copolymer from an elastic material into a viscoelastic material. A given tackifier can be compatible (i.e., miscible) with the glassy block, the rubbery block, or at least partially compatible with both types of blocks. Selective compatibility enables a given tackifier, when added to a styrenic block copolymer, to modify the properties of either the rubbery or glassy domains of the microphase separated structure.

SUMMARY

One drawback of using a microphase separated block copolymer in pressure-sensitive adhesives is its susceptibility to loss of shear resistance at high temperatures. The maximum service temperature of these adhesives can be extended by increasing the softening temperature of the glassy block. This can be accomplished by adding an end block tackifier that increases the glass transition temperature of the styrene domains, while having a minimal effect on the glass transition temperature of the rubbery domains. As described in International Patent Publication No. WO00/24840 (Kobe, et al.), polyphenylene ether (PPE) oligomers can be used as such an end block tackifier to increase the temperature resistance of styrenic block copolymer PSAs.

The need remains, however, for a pressure-sensitive adhesive that is melt processible, displays a high temperature resistance, and adheres strongly to low surface energy substrates, such as substrates made from thermoplastic polyolefins.

It was discovered that low molecular weight, high-$T_g$ oligomeric acrylate tackifiers (HTG) can improve adhesion of acrylate-based and block copolymer-based pressure sensitive adhesives to low surface energy substrates, as reflected by their holding power to these substrates in shear or shear creep testing. The provided adhesive compositions combine the HTG-modified SBC adhesives together with PPE end block tackification. The result is a melt-dispensable microphase separated PSA with superior low surface energy adhesion, good thermal resistance, and excellent energy dissipation.

Figure 1:
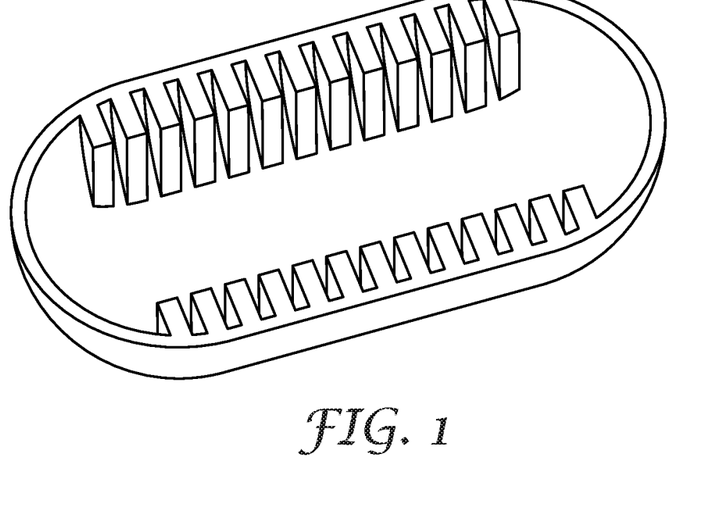
FIG. 1 is a perspective view of a ribbed plastic substrate for use with a provided adhesive composition.

The ability to process these pressure-sensitive adhesives from the melt make them highly useful for bonding to molded articles made from polyolefins, and especially those having extreme surface features, such as the ribbed molded part shown in FIG. 1. A melt-processable adhesive can be heated to flow into the interstices within such a ribbed structure and then cooled to afford a high bond strength not otherwise achievable using a conventional, flat adhesive sheet.

In one aspect, an adhesive composition is provided. The composition comprises: a block copolymer component comprising a midblock segment and a plurality of end block segments, each end block segment comprising polystyrene; a (meth)acrylic functional additive having a glass transition temperature of from 50° C. to 160° C.; a first tackifier compatible with the midblock segment and comprising a hydrocarbon; and a second tackifier compatible with the end block segments and comprising a polyphenylene ether.

In a second aspect, a tape is provided, comprising: a backing; and a pressure-sensitive adhesive layer disposed on the backing and comprised of the adhesive composition.

In a third aspect, a bonded assembly is provided, comprising: a low surface energy substrate; and a pressure-sensitive adhesive layer disposed on the low surface energy substrate and comprised of the adhesive composition.

In a fourth aspect, a method of making a bonded assembly is provided, the method comprising: heating the adhesive composition to a temperature sufficient to obtain a polymer melt; disposing the polymer melt onto a substrate; and cooling the polymer melt and substrate to induce microphase separation of the composition and obtain the bonded assembly.

Repeated use of reference characters in the specification and drawings is intended to represent the same or analogous features or elements of the disclosure. Numerous other modifications and embodiments can be devised by those skilled in the art, which fall within the scope and spirit of the principles of the disclosure. Figures may not be drawn to scale.

Definitions

As used herein:

"ambient temperature" means at a temperature of 25° C.;

"amino" refers to a chemical group containing a basic nitrogen atom with a lone pair (—NHR), and may be either a primary or secondary chemical group;

"average" generally refers to a number average but may, when referring to particle diameter, either represent a number average or volume average;

"compatible with" means miscible with or soluble with;

"cure" refers to exposing to radiation in any form, heating, or allowing to undergo a physical or chemical reaction that results in hardening or an increase in viscosity;

"curing onset temperature" refers to the temperature above which a given curative in a curable composition induces curing in the curable composition, as measured by differential scanning calorimetry at a scan rate of +10° C. per minute;

"fully cure" refers to curing to an extent sufficient for the cured material to be used in its intended application;

"halogen" group refers to a fluorine, chlorine, bromine, iodine, or astatine atom, unless otherwise stated;

"hydrocarbon" refers to a molecule or functional group that includes carbon and hydrogen atoms;

"partially cure" means curing to an extent that is measurable but insufficient for the cured material to be used in its intended application;

"particle diameter" represents the largest transverse dimension of the particle;

"polymer" refers to a molecule having at least one repeating unit and can include copolymers; and "substituted" as used herein in conjunction with a molecule or an organic group as defined herein refers to the state in which one or more hydrogen atoms contained therein are replaced by one or more non-hydrogen atoms.

DETAILED DESCRIPTION

Reference will now be made to various embodiments of the disclosed subject matter. While the disclosed subject matter will be described in conjunction with the enumerated claims, it will be understood that the exemplified subject matter is not intended to limit the claims to the disclosed subject matter.

The terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for description only and not of limitation. Any use of section headings is intended to aid reading of the document and is not to be interpreted as limiting; information that is relevant to a section heading may occur within or outside of that section.

The present disclosure provides adhesive compositions, articles that contain the pressure-sensitive adhesive compositions, along with methods of making such adhesive compositions and articles. Such adhesive compositions can be suitable for use, for example, in pressure-sensitive adhesive compositions.

The adhesive compositions may be suitable for use in tape products, including tape products with and without a backing, and bonded assemblies in which the adhesive composition is disposed onto one or more articles. Adhesive products may be single-sided or double-sided. The adhesive compositions may be present as layers of generally uniform thickness or as shaped adhesive structures to facilitate bonding to rough or irregularly-shaped substrate surfaces or provide other functional advantages.

The adhesive compositions can be processible in the melt by heating the adhesive composition to high temperatures and then cooling to provide a pressure-sensitive adhesive. The pressure-sensitive adhesives derived from these compositions, advantageously, lack any permanent chemical crosslinking that would interfere with subsequent re-processing of the adhesive.

Advantageously, the provided adhesive compositions can contain zero or only trace amounts of volatile organic solvents. In a preferred embodiment, the adhesive composition does not require use of any volatile organic solvent in bonding to a substrate.

In general, the adhesive compositions include a block copolymer having rubbery and glassy segments mixed with a (meth)acrylic functional additive. The composition further includes two distinct tackifiers, the first tackifier based on a hydrocarbon compatible with the midblock segment and the second tackifier based on a polyphenylene ether compatible with the end block segments.

Details concerning the provided adhesive compositions can be found in the subsections below.

Block Copolymer Component

The provided adhesive compositions contain a block copolymer component. The block copolymer component can be a single block copolymer or a mixture of two or more block copolymers. At least one block copolymer in the block copolymer component is a styrenic block copolymer including a rubbery block (or low-$T_g$ block) and two or more glassy blocks (or high-$T_g$ blocks).

At the service temperature of the adhesive, the block copolymer component microphase separates into ordered nanoscale domains that include rubbery block domains and glassy block domains. This ordered structure provides the block copolymer component with useful and unique physical properties. When microphase separated, these copolymers form elastic, dimensionally stable solids that display significant shear strength. Unlike crosslinked rubbers, their materials are capable of being reversibly melted and re-solidified with temperature.

The styrenic block copolymer is often a linear block copolymer of general formula $(G-R)_m G$ where G is a glassy block, R is a rubbery block, and m is an integer equal to at least 1. Variable m can be from 1 to 10, 1 to 5, 1 to 3, or in some embodiments, less than, equal to, or greater than 1, 2, 3, 4, 5, 6, 7, 8, 9, or 10. In a preferred embodiment, the linear block copolymer is a triblock copolymer of formula G-R-G where the variable m in the formula $(G-R)_m$-G is equal to 1.

Alternatively, the styrenic block copolymer can be a star (also known as a radial or multi-arm) block copolymer of general formula $(G-R)_n$—Y where each R and G are the same as defined above, n is an integer equal to at least 3, and Y is the residue of a multifunctional coupling agent used in the formation of the star block copolymer. The variable n represents the number of arms in the star block copolymer and can be from 3 to 10, from 3 to 8, from 3 to 6, or in some embodiments, less than, equal to, or greater than 3, 4, 5, 6, 7, 8, 9, or 10. In both the linear block copolymer and star block copolymer versions of the styrenic block copolymer, the glassy blocks can have the same or different molecular weight. Similarly, if there is more than one rubbery block, the rubbery blocks can have the same or different molecular weights.

Generally, each rubbery block has a glass transition temperature ($T_g$) that is less than ambient temperature. For example, the glass transition temperature can be less than 20° C., less than 0° C., less than −10° C., or less than −20° C., less than −40° C., less than −60° C., or in some embodiments, less than, equal to, or greater than −60° C., −55, −50, −45, −40, −35, −30, −25, −20, −15, −10, −5, 0, 5, 10, 15, or 20° C. The glass transition temperature can be determined using conventional methods known in the art, including Differential Scanning calorimetry or Dynamic Mechanical Analysis.

Each rubbery block in the linear or star block copolymers is typically the polymerized product of a first polymerized conjugated diene, a hydrogenated derivative of a polymerized conjugated diene, or a combination thereof. The conjugated diene often contains 4 to 12 carbon atoms. Conjugated dienes include, but are not limited to, butadiene, isoprene, 2-ethylbutadiene, 1-phenylbutadiene, 1,3-pentadiene, 1,3-hexadiene, 2,3-dimethyl-1,3-butadiene, and 3-ethyl-1,3-hexadiene.

Each rubbery block can be a homopolymer or copolymer. The rubbery block is often poly(butadiene), poly(isoprene), poly(2-ethylbutadiene), poly(1-phenylbutadiene), poly(1,3-pentadiene), poly(1,3-hexadiene), poly(2,3-dimethyl-1,3-butadiene), poly (3-ethyl-1,3-hexadiene), poly(ethylene/propylene), poly(ethylene/butylene), poly(isoprene/butadiene), or the like. In many embodiments, the block R is polybutadiene, polyisoprene, poly(isoprene/butadiene), poly(ethylene/butylene), or poly(ethylene/propylene).

The glass transition temperature of each glassy block is generally at least 50° C., at least 60° C., at least 70° C., at least 80° C., at least 90° C., at least 100° C., or in some embodiments, less than, equal to, or greater than 50° C., 55, 60, 65, 70, 75, 80, 85, 90, 95, or 100° C.

Each glassy block in the linear or star block copolymers is typically the polymerized product of a mono-vinyl aromatic monomer. The mono-vinyl aromatic monomer usually contains, for example, at least 8 carbon atoms, at least 10 carbon atoms, or at least 12 carbon atoms and up to 18 carbon atoms, up to 16 carbon atoms, or up to 14 carbon atoms. Example first mono-vinyl aromatic monomers include, but are not limited to, styrene, vinyl toluene, alpha-methyl styrene, 2,4-dimethyl styrene, ethyl styrene, 2,4-diethyl styrene, 3,5-diethyl styrene, alpha-2-methyl styrene, 4-tert-butyl styrene, 4-isopropyl styrene, and the like.

Each glassy block can be a homopolymer or a copolymer. The glassy block can be poly(styrene), poly(vinyl toluene), poly(alpha-methyl styrene), poly(2,4-dimethyl styrene), poly(ethyl styrene), poly(2,4-diethyl styrene), poly(3,5-diethyl styrene), poly(alpha-2-methyl styrene), poly(4-tert-butyl styrene), poly(4-isopropyl styrene), copolymers thereof, and the like.

In some embodiments, the glassy block is polystyrene homopolymer or is a copolymer derived from a mixture of styrene and a styrene-compatible monomer, which is a monomer that is miscible with styrene. In most cases where the glassy phase is a copolymer, at least 50 weight percent of the monomeric units are derived from styrene. For example, at least 60 weight percent, at least 70 weight percent, at least 80 weight percent, at least 90 weight percent, at least 95 weight percent, at least 98 weight percent, or at least 99 weight percent of the monomeric units in the glassy block is derived from styrene.

The glassy blocks can represent from 5 to 50 percent by weight of the styrenic block copolymer. If the fraction of glassy blocks is too low, the cohesive strength may be too low. On the other hand, if the fraction of glassy blocks is too high, the modulus may be too high (i.e., the composition may be too stiff and/or too elastic) and the resulting composition will not effectively wet out on a substrate surface. The styrenic copolymer can have a styrene (or glassy block) content of from 7% to 40%, 9% to 33%, 13% to 25%, or in some embodiments, less than, equal to, or greater than 7%, 8, 9, 10, 11, 12, 13, 14, 15, 16, 17, 18, 19, 20, 21, 22, 23, 24, 25, 27, 30, 32, 35, 37, or 40%, relative to the overall weight of the styrenic block copolymer.

In addition to the glassy blocks and the rubbery blocks, styrenic block copolymers that are star block copolymers include a multifunctional coupling agent J. The coupling agent often has multiple carbon-carbon double bonds, carbon-carbon triple bonds, or other groups that can react with carbanions of the living polymer used to form the star block copolymers. The multifunctional coupling agents can be aliphatic, aromatic, heterocyclic, or a combination thereof. Example include, but are not limited to, polyvinyl acetylene, diacetylene, di(meth)acrylates (e.g., ethylene dimethacrylate), divinyl benzene, divinyl pyridine, and divinyl thiophene. Other examples include, but are not limited to, multi-functional silyl halide (e.g., tetrafunctional silyl halide), polyepoxides, polyisocyanates, polyketones, polyanhydrides, polyalkenyls, and dicarboxylic acid esters.

The weight average molecular weight of a styrenic block copolymer is often no greater than 1,200,000 g/mol. If the weight average molecular weight is too high, the copolymer will be difficult to use in preparation of a pressure-sensitive adhesive composition. That is, high concentrations of organic solvent would be needed for solution coating. If melt processed, the copolymer would be difficult to extrude due to its high melt viscosity and would be difficult to blend with other materials. By contrast, a molecular weight that is too low can result in a pressure-sensitive adhesive with a cohesive strength that is unacceptably low.

The weight average molecular weight is often no greater than 1,000,000 g/mol, no greater than 900,000 g/mol, no greater than 800,000 g/mol, no greater than 600,000 g/mol, or no greater than 500,000 g/mol. The weight average molecular weight of the styrenic block copolymer is typically at least 75,000 g/mol, at least 100,000 g/mol, at least 200,000 g/mol, at least 300,000 g/mol, or at least 400,000 g/mol.

The weight average molecular weight of the styrenic block copolymer can be from 75,000 g/mol to 1,200,000 g/mol, from 100,000 to 1,000,000 g/mol, from 100,000 to 900,000 g/mol, from 100,000 to 500,000 g/mol, or in some embodiments, less than, equal to, or greater than 75,000 g/mol; 80,000; 85,000; 90,000; 95,000; 100,000; 110,000; 120,000; 130,000; 140,000; 150,000; 160,000; 170,000; 180,000; 190,000; 200,000; 220,000; 240,000; 250,000; 260,000; 280,000; 300,000; 350,000; 400,000; 450,000; 500,000; 600,000; 700,000; 750,000; 800,000; 900,000; 1,000,000; or 1,200,000 g/mol.

Some styrenic block copolymers have glassy blocks that are polystyrene and one or more rubbery blocks selected from polyisoprene, polybutadiene, poly(isoprene/butadiene), poly(ethylene/butylene), and poly(ethylene/propylene). Some even more particular styrenic block copolymers have glassy blocks that are polystyrene and one or more rubbery blocks selected from polyisoprene and polybutadiene.

In some embodiments, the styrenic block copolymer is a first styrenic block copolymer, and the block copolymer components further includes a second styrenic block copolymer that is a diblock copolymer. The diblock copolymer generally has a single glassy block and a single rubbery block, and can be represented here by the chemical structure G-R.

Inclusion of a diblock copolymer can lower the viscosity of the pressure-sensitive adhesive and/or provide functionality akin to that obtained when adding a plasticizer. In some embodiments, the diblock copolymer can increase the tackiness and low temperature performance of the resulting pressure-sensitive adhesive composition. The diblock copolymer also can be used to adjust the flow of the pressure-sensitive adhesive. The amount of diblock can be selected to provide the desired flow characteristics without significantly impacting the cohesive strength of the pressure-sensitive adhesive.

The same glassy blocks and rubbery blocks described with respect to the first styrenic block copolymer (e.g., triblock and star block copolymers) are applicable when describing the second styrenic block copolymer (i.e., the diblock copolymer).

The styrene content in the diblock copolymer can be from 10% to 50%, from 10% to 40%, from 15% to 50%, from 15% to 40%, from 20% to 50%, from 20% to 40%, or in some embodiments, less than, equal to, or greater than 10%, 12, 15, 17, 20, 22, 25, 27, 30, 32, 35, 37, or 40% by weight relative to the overall weight of the diblock copolymer.

The weight average molecular weight of the diblock copolymer can be from 75,000 to 250,000 g/mol, from 100,000 to 250,000 g/mol, from 125,000 to 250,000 g/mol, from 125,000 to 200,000 g/mol, or in some embodiments, less than, equal to, or greater than 75,000 g/mol; 80,000; 85,000; 90,000; 95,000; 100,000; 110,000; 120,000; 130,000; 140,000; 150,000; 160,000; 170,000; 180,000; 190,000; 200,000; 220,000; 240,000; or 250,000 g/mol.

The styrenic component can represent 1 to 30 weight percent of the diblock copolymer based on a total weight of the diblock copolymer. In some embodiments, the diblock copolymer is present in an amount of from 1% to 25%, from 3% to 15%, from 5% to 10%, or in some embodiments, less than, equal to, or greater than 1%, 2, 3, 4, 5, 7, 10, 12, 15, 17, 20, 22, or 25% by weight relative to the overall weight of the second styrenic block copolymer.

In some embodiments, the styrenic component contains 70% to 100% by weight of a star block copolymer and/or linear block copolymer (e.g., linear triblock copolymer) and 0% to 30% by weight of a diblock copolymer, 70% to 99% by weight of a star block copolymer and/or linear block copolymer and 1% to 30% by weight of a diblock copolymer, 70% to 90% by weight of a star block copolymer and/or linear block copolymer and 10% to 30% by weight of a diblock copolymer, 75% to 100% by weight of a star block copolymer and/or linear block copolymer and 0% to 25% by weight of a diblock copolymer, 75% to 99% by weight of a star block copolymer and/or linear block copolymer and 1% to 25% by weight of a diblock copolymer, 75% to 90% by weight of a star block copolymer and/or linear block copolymer and 10% to 25% by weight of a diblock copolymer, 80% to 100% by weight of a star block copolymer and/or linear block copolymer and 0% to 20% by weight of a diblock copolymer, 80% to 99% by weight of a star block copolymer and/or linear block copolymer and 1% to 20% by weight of a diblock copolymer, or 80% to 90% by weight of a star block copolymer and/or linear block copolymer and 10% to 20% by weight of a diblock copolymer.

In many embodiments, the styrenic component contains 70% to 100% by weight of a linear triblock copolymer and 0% to 30% percent by weight of a diblock copolymer, 70% to 99% by weight of a linear triblock copolymer and 1% to 30% by weight of a diblock copolymer, 70% to 95% by weight of a linear triblock copolymer and 5% to 30% by weight of a diblock copolymer, or 70% to 90% by weight of a triblock copolymer and 10% to 30% by weight of a diblock copolymer.

The block copolymer component can be present in any suitable amount in the adhesive composition. For example, the block copolymer component is present in amount of from 30% to 60%, from 35% to 55%, from 40% to 50%, or in some embodiments, less than, equal to, or greater than 30%, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight relative to the overall weight of the composition.

Suitable materials for use as the styrenic component alone or in combination are commercially available under the trade designation KRATON (e.g., KRATON D1161P, D1118, D1119, and A1535) from Kraton Performance Polymers (Houston, TX, USA), under the trade designation SOLPRENE (e.g., SOLPRENE S-1205) from Dynasol (Houston, TX, USA), under the trade designation QUINTAC from Zeon Chemicals (Louisville, KY, USA), and under the trade designations VECTOR and TAIPOL from TSRC Corporation (New Orleans, LA, USA).

The pressure-sensitive adhesive can contain from 40% to 60% by weight of the styrenic component based on the total weight of the pressure-sensitive adhesive. If the amount of the styrenic component is too low, the tackifier level may be too high and the resulting $T_g$ of the composition may be too high (e.g., the composition may not be a pressure-sensitive adhesive), particularly in the absence of a plasticizer. If the amount of the styrenic component is too high, the composition may have a modulus that is too high (e.g., the composition may be too stiff and/or too elastic) and the composition may not properly wet out when applied to a substrate.

The amount of the styrenic component can be from 40% to 60%, 40% to 55%, 40% to 50%, 45% to 60%, 45% to 55%, 50% to 60%, or in some embodiments, less than, equal to, or greater than 40%, 41, 42, 43, 44, 45, 46, 47, 48, 49, 50, 51, 52, 53, 54, 55, 56, 57, 58, 59, or 60% by weight relative to the total weight of the pressure-sensitive adhesive.

First (Meth)Acrylic Functional Additive

The pressure-sensitive adhesive composition contains a (meth)acrylic functional additive. The (meth)acrylic functional additive is generally non-polar but can contain small amounts of polar monomeric units as described below. This (meth)acrylic functional additive was found to provide the adhesive with high temperature holding power to low surface energy substrates. The additive can also impart a "primerless" feature to the adhesive, in which no primer or adhesion promoter is needed prior to making a bond with the provided adhesive composition.

The functional additive is comprised of a (meth)acrylic polymer or optionally a mixture of two or more (meth)acrylic polymers. The (meth)acrylic polymers, in each case, can be linear. Each (meth)acrylic polymer can be a random copolymer obtained by polymerizing a monomer mixture. In some embodiments, at least 60 weight percent, at least 70 weight percent, at least 80 weight percent, at least 90 weight percent, at least 95 weight percent, at least 98 weight percent, at least 99 weight percent, or 100 weight percent of the monomer mixture has a (meth)acryloyl group of formula —(CO)—CR=CH$_2$, where R is hydrogen or methyl group.

The (meth)acrylic functional additive has an overall glass transition temperature that is well above ambient temperature. The glass transition temperature can be from 60° C. to 160° C., from 75° C. to 120° C., from 80° C. to 105° C., or in some embodiments, less than, equal to, or greater than, 50° C., 55, 60, 65, 70, 75, 80, 85, 90, 95, 100, 105, 110, 115, 120, 125, 130, 135, 140, 145, 150, 155, or 160° C.

The (meth)acrylic functional additive can be the polymerization product of one or more known high-T$_g$ monomers. Suitable high-T$_g$ monomers include, but are not limited to, methyl methacrylate, ethyl methacrylate, n-propyl methacrylate, isopropyl methacrylate, isobutyl methacrylate, sec-butyl methacrylate, tert-butyl (meth)acrylate, phenyl (meth)acrylate, cyclohexyl (meth)acrylate, isobornyl (meth)acrylate, benzyl (meth)acrylate, 3,3,5 trimethylcyclohexyl (meth)acrylate, and mixtures thereof.

The one or more high-T$_g$ monomers can be present in an amount of from 30% to 100%, 50% to 98%, 70% to 95%, or in some embodiments, less than, equal to, or greater than 30%, 32, 35, 37, 40, 42, 45, 47, 50, 52, 55, 57, 60, 62, 65, 67, 70, 72, 75, 77, 80, 82, 85, 87, 90, 92, 95, 97, 98, or 99%, or less than or equal to 100% by weight, relative to the overall weight of monomers in the monomer mixture used to synthesize the (meth)acrylic functional additive.

In addition to the high-T$_g$ monomer, the monomer mixture can include an optional polar monomer, an optional low-T$_g$ monomer, an optional vinyl monomer that does not include a (meth)acryloyl group, or a mixture thereof. These monomers can be provided in any suitable amount in the monomer mixture to provide polymerized functional additive characterized by an overall T$_g$. The overall T$_g$ of the (meth)acrylic functional additive can be from 50° C. to 160° C., from 60° C. to 150° C., from 75° C. to 120° C., or in some embodiments, less than, equal to, or greater than 50° C., 55, 60, 65, 70, 75, 80, 85, 90, 95, 100, 105, 110, 115, 120, 125, 130, 135, 140, 145, 150, 155, or 160° C.

One or more optional low-T$_g$ monomers are known in the art and can include any of the monomers described in the subsection below, entitled "Second (meth)acrylic functional additive." Preferably, the low-T$_g$ monomer, if present, is miscible with the high-T$_g$ monomer(s) and any other components present in the (meth)acrylic functional additive. Including a low-T$_g$ into the monomer mixture can be useful in adjusting the overall T$_g$ of the final polymerized (meth)acrylic functional additive.

One or more polar monomers can be mixed into in the monomer mixture and polymerized to obtain the (meth)acrylic functional additive. Useful polar monomers can have an ethylenically unsaturated group plus a polar group such as an acidic group or a salt thereof, a hydroxyl group, a primary amido group, a secondary amido group, a tertiary amido group, or an amino group. Introducing a polar monomer into the functional additive can facilitate adhesion of the pressure-sensitive adhesive to certain substrates.

In some embodiments, the polar monomer is a polar (meth)acrylic monomer. The polar acrylic (meth)acrylic monomer can have an acidic group. Such monomers include ethylenically unsaturated carboxylic acids, ethylenically unsaturated sulfonic acids, ethylenically unsaturated phosphonic acids, and mixtures thereof. Specific examples include acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, and vinyl phosphonic acid.

Polar monomers containing a hydroxyl group include, for example, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide and 3-hydroxypropyl (meth)acrylamide), ethoxylated hydroxyethyl (meth)acrylate (e.g., monomers commercially available from Sartomer USA (Exton, PA, USA) under the trade designation CD570, CD571, and CD572), and aryloxy substituted hydroxyalkyl (meth)acrylates (e.g., 2-hydroxy-2-phenoxypropyl (meth)acrylate).

Polar monomers containing a primary amido group include, for example, (meth)acrylamide. Polar monomers with secondary amido groups include, for example, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide.

Polar monomers containing a tertiary amido group include, for example, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The amount of the optional polar monomer can be from 0.5% to 12%, from 2% to 10%, from 0.5% to 10%, from 3% to 8%, or in some embodiments, equal to or greater than 0%, or less than, equal to, or greater than 0.1%, 0.2, 0.3, 0.4, 0.5, 0.6, 0.7, 0.8, 0.9, 1, 1.1, 1.2, 1.3, 1.4, 1.5, 1.7, 2, 2.2, 2.5, 2.7, 3, 3.2, 3.5, 3.7, 4, 4.5, 5, 5.5, 6, 6.5, 7, 7.5, 8, 8.5, 9, 9.5, 10, 10.5, 11, 11.5, or 12% by weight relative to the overall weight of monomers in the monomer mixture used to polymerize the (meth)acrylic functional additive.

In some embodiments, the monomer mixture used to form the (meth)acrylic functional additive contains from 85% to 100% by weight high-T$_g$ monomer and 0% to 15% by weight polar monomer. For example, the monomer mixture can contain 85% to 99.5% by weight high-T$_g$ monomer and 0.5% to 15% by weight polar monomer, 85% to 99% by weight high-T$_g$ monomer and 1% to 15% by weight polar monomer, or 90% to 99% by weight high-T$_g$ monomer and 1% to 10% by weight polar monomer. For each of the ranges above, percentages are based on the total weight of monomers in the monomer mixture.

In some embodiments, the (meth)acrylic functional additive contains 85% to 100% by weight high-T$_g$ monomers and 0% to 15% by weight polar monomers. For example, the (meth)acrylic functional additive can contain 85% to 99.5% by weight high-T$_g$ monomers and 0.5% to 15% by weight polar monomers, 85% to 99% by weight high-T$_g$ monomers and 1% to 15% by weight polar monomers, or 90% to 99% by weight high-T$_g$ monomers and 1% to 10% by weight polar monomers, in each case based on the overall weight of monomeric units in the monomer mixture. As used herein, the term "monomeric unit" refers to the polymerized version of the monomer (i.e., the ethylenically unsaturated group of the monomer has undergone polymerization with other ethylenically unsaturated monomers).

Optionally one or more vinyl monomers are included in the monomer mixture that do not contain a (meth)acryloyl group. Examples of optional vinyl monomers include, but are not limited to, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof. The vinyl monomers having a group characteristic of polar monomers are considered herein to be polar monomers.

Advantageously, the (meth)acrylic functional additives are generally linear polymers and are not crosslinked. The lack of crosslinking facilitates mixing and compatibility with the styrenic component of the pressure-sensitive adhesive.

In some embodiments, the monomer mixture contains 30% to 100% by weight high-$T_g$ monomer, 0% to 15% by weight polar monomer, 0% to 50% by weight low-$T_g$ monomer, and 0% to 15% by weight vinyl monomers that do not include a (meth)acryloyl group. In still other embodiments, the monomer mixture contains 60% to 100% by weight high-$T_g$ monomer, 0% to 15% by weight polar monomer, 0% to 20% by weight low-$T_g$ monomer, and 0% to 10% by weight vinyl monomers that do not include a (meth)acryloyl group. In yet other embodiments, the monomer mixture contains 75% to 100% by weight high-$T_g$ monomer, 0% to 10% by weight polar monomer, 0% to 10% by weight low-$T_g$ monomer, and 0% to 5% by weight vinyl monomers that do not include a (meth)acryloyl group. Similar compositional ranges apply to (meth)acrylic functional additives polymerized from the monomer mixtures described above.

In some embodiments, the (meth)acrylic functional additive contain up to 100 weight percent methyl methacrylate monomeric units. Optionally, the additive can contain a mixture of isobornyl (meth)acrylate monomeric units and a polar monomeric unit such as (meth)acrylic acid monomeric units or N,N-dimethylacrylamide monomeric units.

When the monomer mixture is polymerized, the resulting (meth)acrylic functional additive can have any suitable molecular weight. The (meth)acrylic functional additive can have a weight average molecular weight ($M_w$) of from 1,000 g/mol to 300,000 g/mol, from 10,000 g/mol to 75,000 g/mol, from 25,000 to 40,000 g/mol, or in some embodiments, less than, equal to, or greater than 1,000 g/mol; 2,000; 3,000, 4,000; 5,000; 6,000; 7,000; 8,000; 9,000; 10,000; 15,000; 20,000; 25,000; 30,000; 35,000; 40,000, 45,000; 50,000; 60,000; 70,000; 80,000; 90,000; 100,000; 120,000; 150,000; 170,000; 200,000; 220,000; 250,000; 270,000; or 300,000 g/mol.

Useful (meth)acrylic functional additives are commercially available under the trade designation ELVACITE (e.g., ELVACITE 2008C, E2013, E2043, and E4402) from Lucite International Inc. in Cordova, TN The (meth)acrylic functional additive may also be prepared using any known synthetic method. Suitable methods include, for example, free radical polymerization methods, such as those described in co-pending International Patent Application No. IB2017/057845 (Chastek et al.).

The amount of the (meth)acrylic functional additive should be present in a suitable amount relative to the total weight of the adhesive composition. If the amount is to low, the composition may not have sufficient holding power on a broad range of substrates (e.g., substrates having a variety of surface energy values), particularly at elevated temperatures. On the other hand, if the amount is too high, the composition may have a glass transition temperature that is too high. That is, the overall composition may be too glassy to function as a pressure-sensitive adhesive.

The amount of (meth)acrylic functional additive present in the adhesive composition should be sufficient to have an effect but not so large that the additive phase separates from the remainder of the adhesive composition and degrades performance. It is typical for (meth)acrylic functional additive to be from 1% to 12%, from 2% to 8%, from 3% to 6%, or in some embodiments, less than, equal to, or greater than 1, 1.5, 2, 2.5, 3, 3.5, 4, 4.5, 5, 5.5, 6, 6.5, 7, 7.5, 8, 8.5, 9, 9.5, 10, 10.5, 11, 11.5, or 12% by weight relative to the total weight of the adhesive composition.

Second (Meth)Acrylic Functional Additive

The provided adhesive compositions optionally contain a second (meth)acrylic functional additive. The second (meth)acrylic functional additive has a polarity that is high relative to that of the block copolymer component of the adhesive composition. This polarity has been found to improve moisture tolerance of the adhesive when bonding to particular substrates. The second (meth)acrylic functional additive can be, in some embodiments, itself a pressure-sensitive adhesive composition.

Applications in which moisture tolerance is beneficial include bonding to, for example, automotive clearcoat films, household paints such as latex paints, and hygroscopic substrates that tend to absorb moisture. In some embodiments, the polar nature of the second (meth)acrylic functional additive improves adhesion by wicking moisture away from the bond interface. This additive may not be needed for certain substrates, but can broaden the range of suitable substrates for the provided adhesive composition.

In various embodiments, the second (meth)acrylic functional additive is a random copolymer of a mixture of low-$T_g$ monomers. The random copolymer can have an overall glass transition temperature that is well below ambient temperature. The glass transition temperature can be from −60° C. to 25° C., from −55° C. to 10° C., from −50° C. to 0° C., or in some embodiments, less than, equal to, or greater than −60° C., −55, −50, −45, −40, −35, −30, −25, −20, −15, −10, −5, 0, 5, 10, 15, 20, 25, 30, or 35° C. Suitable low-$T_g$ monomers include certain alkyl (meth)acrylates, heteroalkyl (meth)acrylates, and aryl substituted alkyl acrylates and aryloxy substituted alkyl acrylates.

Useful low-$T_g$ alkyl (meth)acrylate monomers include alkyl methacrylates having a linear alkyl group with at least 4 carbon atoms. Specific examples of alkyl (meth)acrylates include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-me thylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate.

Low-$T_g$ monomers also include heteroalkyl (meth)acrylate monomers having at least 3 carbon atoms, at least 4 carbon atoms, or at least 6 carbon atoms and up to 30 or more carbon atoms, up to 20 carbon atoms, up to 18 carbon atoms, up to 16 carbon atoms, up to 12 carbon atoms, or up to 10 carbon atoms. Specific heteroalkyl (meth)acrylates include, for example, 2-ethoxyethyl acrylate, 2-(2-ethoxyethoxy)ethyl acrylate, 2-methoxyethyl (meth)acrylate, and tetrahydrofurfuryl (meth)acrylate. Heteroalkyl (meth)acrylate monomers further include aryl substituted alkyl acrylates or aryloxy substituted alkyl acrylates including 2-biphenylhexyl acrylate, benzyl acrylate, 2-phenoxyethyl acrylate, and 2-phenylethyl acrylate.

In this case, the copolymer obtained from the polar monomers can have a weight average molecular weight of from 200,000 g/mol to 1,500,000 g/mol, from 300,000 g/mol to 900,000 g/mol, from 500,000 g/mol to 900,000 g/mol, or in some embodiments, less than, equal to, or greater than 200,000 g/mol; 300,000; 400,000; 500,000; 600,000; 700,000; 800,000; 900,000; 1,000,000; 1,100,000; 1,200,000; 1,300,000; 1,400,000; or 1,500,000 g/mol.

Various other monomers could be included in the mixture of low $T_g$ monomers used to polymerize the second (meth) acrylic functional additive where the $T_g$ and molecular weight properties described above are retained. Acrylic acid, for example, can be added in small amounts to afford an adhesive with improved moisture tolerance.

The amount of the second (meth)acrylic functional additive present in the adhesive composition is generally small compared with that of the first (meth)acrylic functional additive. Where present, the second (meth)acrylic functional additive can be present in an amount of from 0.5% to 10%, from 1% to 7%, from 2% to 4%, or in some embodiments, less than, equal to, or greater than 0.5, 0.6, 0.7, 0.8, 0.9, 1, 1.1, 1.2, 1.5, 1.7, 2, 2.5, 3, 3.5, 4, 4.5, 5, 5.5, 6, 6.5, 7, 7.5, 8, 8.5, 9, 9.5, or 10% by weight relative to the total weight of the adhesive composition.

Hydrocarbon Tackifier

The provided adhesive compositions contain a first tackifier compatible with the rubbery midblock segment and comprising a hydrocarbon.

The first tackifier is compatible with the rubbery block of the styrenic block copolymer and can be an aliphatic hydrocarbon tackifier, a terpene tackifier, a terpene phenolic tackifier, or a mixture thereof. The hydrocarbon tackifier is preferably compatible with the rubbery block but not with the glassy blocks of the block copolymer component. When incorporated into the adhesive composition in suitable quantities, the addition of the hydrocarbon tackifier can improve adhesion of the adhesive composition to low surface energy substrates.

The compatibility of the tackifier with the rubbery block can be determined by measuring the effect of the tackifier on the glass transition temperature of the rubbery block. If a tackifier is compatible, it will generally increase the glass transition temperature of the rubber block. Tackifiers such as hydrocarbon tackifiers, terpene tackifiers, and terpene phenolic tackifiers tend to be especially compatible with the rubbery block.

Useful hydrocarbon tackifiers include aliphatic hydrocarbon resins. In some embodiments, the aliphatic hydrocarbons are fully hydrogenated. Examples of hydrocarbon tackifiers include, but are not limited to, those commercially available under the trade designation ARKON (e.g., ARKON P140 and ARKON P125) from Arakawa Europe GmbH in Eschborn, Germany, under the trade designation REGALREZ (e.g., REGALREZ 1126) from Eastman Chemical Co. in Kingsport, TN, REGALITE (e.g., REGALITE 1125) from Eastman Chemical Co., under the trade designation ESCOREZ (e.g., ESCOREZ 5615, 5320, 1315, 1304, 5637, and 5340) from ExxonMobil Chemical Company in Spring, TX, under the trade designation OPPERA (e.g., OPPERA PR 100A) from Exxon, under the trade designation NEVTAC (e.g., NEVTAC 115) from Neville Chemical Company in Pittsburgh, PA, under the trade designation H-REZ (e.g., H-REZ C9 125H) from NUROZ LLC, in Miami, FL, under the trade designation ALPHATAC (e.g., ALPHATACK 115) from R.E. Carroll, Inc. in Ewing, NJ, under the trade designation RESINALL (e.g., RESINALL 1030 and 1030A) from Resinall Corporation in Severn, NC, and under the trade designation FUCLEAR (FUCLEAR FP-125 and FP-100) from United Performance Materials Corporation in Taipei, Taiwan.

Other suitable hydrocarbon tackifiers include terpenes. Terpenes include polyterpenes (e.g., alpha pinene-based resins, beta pinene-based resins, and limonene-based resins). Examples of terpenes include those available under the trade designation CLEARON (e.g., CLEARON P150 and P135) from Yasuhara Chemical Company, Ltd. in Hiroshima, Japan.

Still other suitable first tackifiers include terpene phenolic resins, also referred to as terpene phenolic tackifiers, or terpene phenolics. Example terpene phenolics include, but are not limited to, those available under the trade designation YS POLYSTER (e.g., POLYSTER T115, T160, T130, S145, and G150) from Yasuhara Chemical Company, Ltd. In Hiroshima, Japan.

The hydrocarbon tackifier can have a softening point from 80° C. to 160° C., from 100° C. to 150° C., from 115° C. to 145° C., or in some embodiments, less than, equal to, or greater than 80° C., 85, 90, 95, 100, 105, 110, 115, 120, 125, 130, 135, 140, 145, 150, 155, or 160° C. In some embodiments, the hydrocarbon tackifier is an aliphatic polymer to provide the desired compatibility with the rubbery block and to minimize compatibility with the glassy blocks.

The amount of the first tackifier present in the adhesive composition can be from 15% to 50%, from 20% to 45%, from 25% to 40%, or in some embodiments, less than, equal to, or greater than 15%, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight relative to the overall weight of the adhesive composition. If the amount is too high, the glass transition temperature of the resulting composition may be so high that it would not function as a pressure-sensitive adhesive. If the amount is too low, however, the modulus may be too high and the composition may not wet out well on substrate surfaces.

Polyphenylene Ether Tackifier

The provided adhesive compositions further contain a second tackifier that is compatible with the glassy end block segment and comprises a phenyl ether polymer such as polyphenylene ether or polyphenylene oxide. In some embodiments, the phenyl ether polymer contains the repeating unit shown in Structure I below:

(I)

wherein each X is independently a monovalent substituent selected from the group consisting of hydrogen, halogen, hydrocarbon radicals, halohydrogen radicals having at least two carbon atoms between the halogen atom and the phenyl nucleus, hydrocarbonoxy radicals, and halohydrocarbonoxy radicals having at least two carbon atoms between the halogen atoms and phenyl nucleus. In some embodiments, each X is a methyl group.

In some embodiments, the phenyl ether polymer is a polyphenylene ether that does not have any substituents on the phenoxy unit, and where the linkages are not at para positions.

By increasing the glass transition temperature of the glassy blocks of the block copolymer component, inclusion of the polyphenylene ether resin can significantly increase the service temperature of the adhesive. The polyphenylene ether resins have a $T_g$ and molecular weight within ranges that allow the resin to be compatible with the glassy block copolymer component. Suitable polyphenylene ether resins are commercially available under the trade designation SA90 and SA120 from Sabic in Riyadh, Saudi Arabia.

The polyphenylene ether resin can provide the tackifier with a softening point of from 100° C. to 230° C., from 120° C. to 220° C., from 135° C. to 175° C., or in some embodiments, less than, equal to, or greater than 100° C., 105, 110, 115, 120, 125, 130, 135, 140, 145, 150, 155, 160, 165, 170, 175, 180, 185, 190, 195, 200, 205, 210, 215, 220, 225, and 230° C.

Polyphenylene ether resins can have a weight average molecular weight ($M_W$) of from 1,000 to 25,000 g/mol, from 2,000 to 10,000 g/mol, from 4,000 to 8,000 g/mol, or in some embodiments, less than, equal to, or greater than 1,000 g/mol; 1,200; 1,500, 1,700; 2,000; 2,500; 3,000; 3,500; 4,000; 4,500; 5,000; 5,500; 6,000; 6,500; 7,000; 7,500; 8,000, 8,500; 9,000; 9,500; 10,000; 11,000; 12,000; 13,000; 14,000; 15,000; 16,000; 17,000; 18,000; 19,000; 20,000; 21,000; 22,000; 23,000; 24,000; 25,000; 30,000; 35,000; 40,000; 45,000; or 50,000 g/mol.

The second tackifier may be comprised partly or entirely of one or more polyphenylene ether resins. The amount of the second tackifier present in the adhesive composition is generally smaller than the amount of the first tackifier and can be from 1% to 15%, from 2% to 10%, from 4% to 8%, or in some embodiments, less than, equal to, or greater than 1%, 1.5, 2, 2.5, 3, 3.5, 4, 4.5, 5, 5.5, 6, 6.5, 7, 7.5, or 8% by weight relative to the overall weight of the adhesive composition.

Polyphenylene ether resins can be made by any known method. Suitable methods of preparation are described in U.S. Pat. No. 3,306,874 (Hay); U.S. Pat. No. 3,306,875 (Hay); U.S. Pat. No. 3,257,357 (Stamatoff); and U.S. Pat. No. 3,257,358 (Stamatoff).

Further Optional Additives

Other fillers may be included in the provided adhesive compositions to afford functional and ornamental features.

In some embodiments, the adhesive composition is a foamed composition. The foamed adhesive can be prepared by mixing into the adhesive composition a physical blowing agent, chemical blowing agent, or a low-density filler. Useful low-density fillers include, for example, hollow glass microspheres.

Foamed adhesive compositions not only reduce weight but can be advantageous in applications where it is necessary for the adhesive to conform to surfaces that are rough or irregularly shaped.

Adhesive Assemblies

Figure 2:
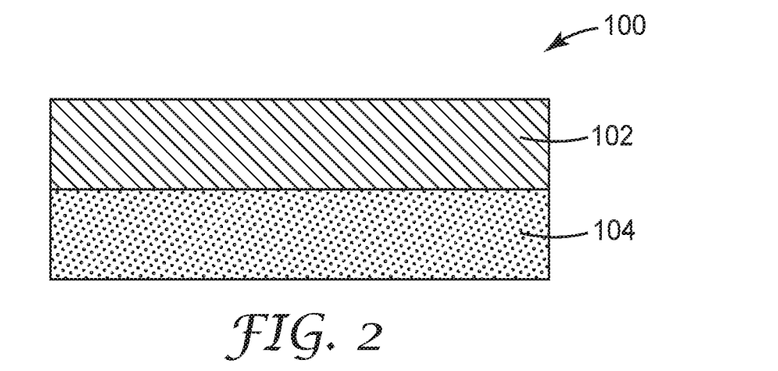
FIGS. 2-3 are side elevational views of an adhesive-backed tapes based on provided adhesive compositions.

An adhesive-backed tape in one exemplary embodiment is illustrated in FIG. 2 and designated by the numeral 100. The adhesive-backed tape 100 includes a backing 102 and a pressure-sensitive adhesive 104 made from the provided adhesive composition. As shown, the pressure-sensitive adhesive 104 is present as a layer extending across and directly contacting the backing 102. Advantageously, no primer layer is needed or present between the backing 102 and the pressure-sensitive adhesive 104.

The backing 102 can be made from any known material suitable for tape backings. Materials suitable for the backing 102 include a polymeric foams and solid films made from polyolefins, such as polyethylene, including high density polyethylene, low density polyethylene, linear low density polyethylene, and linear ultra-low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations thereof. If the backing 102 is a foam, it can be either an open-cell or closed-cell foam. Further, the backing 102 may be made from an adhesive or non-adhesive material.

Figure 3:
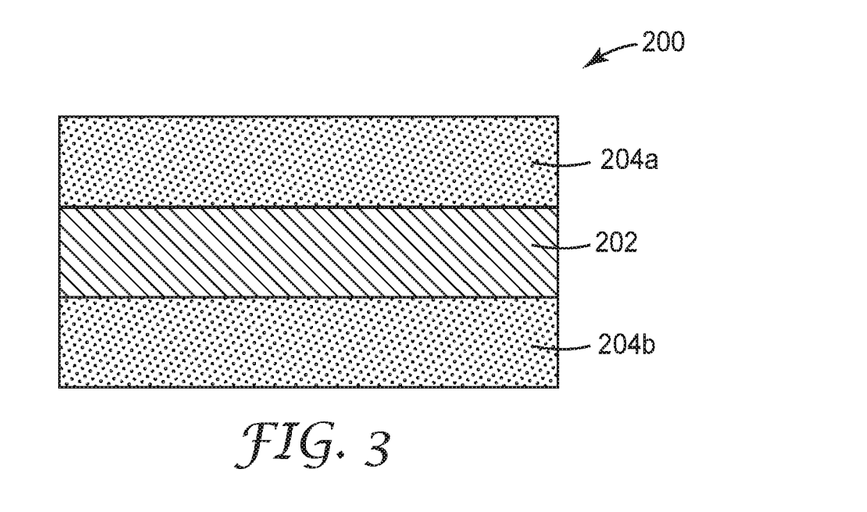

FIG. 3 shows a double-sided tape 200 that include a first pressure-sensitive adhesive 204a disposed on a side of a backing 202 opposite that of a second pressure-sensitive adhesive 204b. Such a dual-sided construction may be appropriately used, for instance, when bonding two different substrates to each another. The second pressure-sensitive adhesive 204b may be made from the same adhesive or a different adhesive from the first pressure-sensitive adhesive 204a.

The provided adhesive compositions are melt processable, enabling their use in bonding to substrates with non-planar surfaces. This application is exemplified by the bonded assembly 300 illustrated in FIG. 4. The bonded assembly 300 shows a pressure-sensitive adhesive 304 interposed between a first substrate 306 and a second substrate 308, where the second substrate 308 is the molded part having a plurality of protruding ribs, as depicted in FIG. 1.

Figure 4:
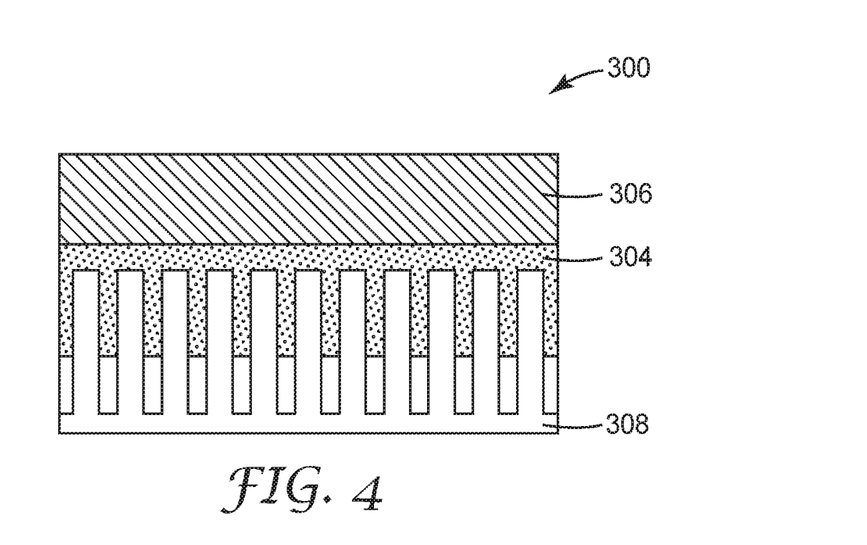
FIG. 4 is a fragmentary side view of a bonded assembly in which a provided adhesive composition is used to adhere the substrate of FIG. 1 to a different substrate.

As shown the pressure-sensitive adhesive 304 partially fills the cavities between the ribs of the second substrate 308, thereby allowing for a greater bond surface area and improved overall bond strength. This can be achieved by disposing the adhesive composition onto the second substrate 308 in molten form, allowing the melt to penetrate into the ribbed structure, and then cooling the adhesive composition to induce microphase separation of the adhesive composition and obtain the pressure-sensitive adhesive 304. The pressure-sensitive adhesive 304 can then be adhered to the first substrate 306. Optionally, the cavities of the second substrate 308 can be fully filled with the pressure-sensitive adhesive 304.

The sequence of steps above can be different from what is described above. For example, the adhesive composition may be disposed between the first and second substrates 306, 308 in molten form, the first and second substrates 306, 308 pressed together, and the adhesive composition cooled to form the bonded assembly 300 directly. Alternatively, the adhesive composition may be disposed between the second substrate 308 and a disposable release liner (not shown here), the second substrate 308 and release liner pressed together, and then the adhesive composition cooled to form the pressure-sensitive adhesive 304. Later, the pressure-sensitive adhesive 304 can be peeled away from the release liner and adhered to the first substrate 306 to form the bonded assembly 300.

In some embodiments, the adhesive composition has a topologically-structured surface. The topologically-structured surface can be used to provide, for example, a layer of adhesive composition that varies in thickness depending on its location on the substrate.

A topologically-structured surface can include an array of protrusions or depressions disposed on a surface that is otherwise planar. The protruding or depressed regions may be continuous or discrete in nature. The protrusions or depressions can be randomized across the topologically-structured surface or disposed according to a pre-determined replicated pattern with features regularly spaced from each other. Patterns of this type include rectilinear and hexagonal patterns.

The adhesive composition can be provided with a topologically-structured surface by disposing the adhesive composition from the polymer melt onto a topologically structured release surface and then cooling the composition to emboss the adhesive with a topologically-structured surface. Advantageously, such an adhesive can be a pressure-sensitive adhesive that can be transported and/or stored in this configuration. The pressure-sensitive adhesive can be later peeled away from the release surface prior to use.

The method above is merely exemplary, and other methods of smoothing or shaping the adhesive composition could be used by placing the adhesive composition in contact with a suitably shaped tool. If desired, the adhesive composition could be smoothed, embossed, or otherwise shaped after it has been disposed on a release surface or substrate, after it has microphase separated, or both.

In the aforementioned embodiments, the adhesive composition is applied onto the substrate as hot melt PSA using an automated method. Automated methods include use of a robotic arm to coat a PSA melt onto the substrate in a continuous or discontinuous manner.

Applications for the coated adhesive compositions are very diverse and can include bonding solutions for corrugated materials, flooring, laminates, foams, porous fabrics, packaging materials, bookbinding, disposable products such as diapers and hygiene products, appliances, case and carton sealing, shoe manufacturing, electrical wires, wire bundles, and wire harnesses.

Either or both of the first and second substrates 206, 208 can be made from a low surface energy material, such as a thermoplastic polyolefin. Suitable substrates can be provided with any suitable size or shape. In one useful application the substrate is a clear coat layer, such as low surface energy clear coat layer, as might be provided on an aerospace or automotive exterior surface.

While not intended to be limiting, further exemplary embodiments are provided as follows.
1. An adhesive composition comprising: a block copolymer component comprising a midblock segment and a plurality of end block segments, each end block segment comprising polystyrene; a (meth)acrylic functional additive having a glass transition temperature of from 50° C. to 160° C.; a first tackifier compatible with the midblock segment and comprising a hydrocarbon; and a second tackifier compatible with the end block segments and comprising a polyphenylene ether.
2. The composition of embodiment 1, wherein the (meth) acrylic functional additive has a glass transition temperature of from 60° C. to 150° C.
3. The composition of embodiment 2, wherein the (meth) acrylic functional additive has a glass transition temperature of from 75° C. to 120° C.
4. The composition of any one of embodiments 1-3, wherein the first tackifier has a softening point temperature of from 80° C. to 160° C.
5. The composition of embodiment 4, wherein the first tackifier has a softening point temperature of from 100° C. to 150° C.
6. The composition of embodiment 5, wherein the first tackifier has a softening point temperature of from 115° C. to 145° C.
7. The composition of any one of embodiments 1-6, wherein the second tackifier has a softening point temperature of from 100° C. to 230° C.
8. The composition of embodiment 7, wherein the second tackifier has a softening point temperature of from 120° C. to 220° C.
9. The composition of embodiment 8, wherein the second tackifier has a softening point temperature of from 135° C. to 170° C.
10. The composition of any one of embodiments 1-9, wherein the polyphenylene ether has a number average molecular weight of from 300 g/mol to 50,000 g/mol.
11. The composition of embodiment 10, wherein the polyphenylene ether has a number average molecular weight of from 1000 g/mol to 20,000 g/mol.
12. The composition of embodiment 11, wherein the polyphenylene ether has a number average molecular weight of from 1500 g/mol to 2500 g/mol.
13. The composition of any one of embodiments 1-12, wherein the (meth)acrylic functional additive has a weight average molecular weight of from 1000 g/mol to 300,000 g/mol.
14. The composition of embodiment 13, wherein the (meth)acrylic functional additive has a weight average molecular weight of from 10,000 g/mol to 75,000 g/mol.
15. The composition of embodiment 14, wherein the (meth)acrylic functional additive has a weight average molecular weight of from 25,000 g/mol to 40,000 g/mol.
16. The composition of any one of embodiments 1-15, wherein the block copolymer component comprises a mixture of two of more of styrenic diblock, styrenic triblock, and styrenic star block copolymers.
17. The composition of any one of embodiments 1-16, wherein the midblock segment comprises polyisoprene, polybutadiene, poly(ethylene/butylene), poly(ethylene/propylene), polyisobutylene or a copolymer or mixture thereof
18. The composition of any one of embodiments 1-17, wherein the block copolymer component has an average styrene content of from 7% to 40% by weight.
19. The composition of embodiment 18, wherein the block copolymer component has a styrene content of from 9% to 33% by weight.
20. The composition of embodiment 19, wherein the block copolymer component has a styrene content of from 13% to 25% by weight.
21. The composition of any one of embodiments 1-20, wherein the block copolymer component is present in amount of from 30% to 60% by weight relative to the overall weight of the composition.
22. The composition of embodiment 21, wherein the block copolymer component is present in amount of from 35% to 55% by weight relative to the overall weight of the composition.
23. The composition of embodiment 22, wherein the block copolymer component is present in amount of from 40% to 50% by weight relative to the overall weight of the composition.
24. The composition of any one of embodiments 1-23, wherein the first tackifier is present in amount of from 15% to 50% by weight relative to the overall weight of the composition.

25. The composition of embodiment 24, wherein the first tackifier is present in amount of from 20% to 45% by weight relative to the overall weight of the composition.
26. The composition of embodiment 25, wherein the first tackifier is present in amount of from 25% to 40% by weight relative to the overall weight of the composition.
27. The composition of any one of embodiments 1-26, wherein the second tackifier is present in amount of from 1% to 15% by weight relative to the overall weight of the composition.
28. The composition of embodiment 27, wherein the second tackifier is present in amount of from 2% to 10% by weight relative to the overall weight of the composition.
29. The composition of embodiment 28, wherein the second tackifier is present in amount of from 4% to 8% by weight relative to the overall weight of the composition.
30. The composition of any one of embodiments 1-29, wherein the (meth)acrylic functional additive is present in amount of from 1% to 12% by weight relative to the overall weight of the composition.
31. The composition of embodiment 30, wherein the (meth)acrylic functional additive is present in amount of from 2% to 8% by weight relative to the overall weight of the composition.
32. The composition of embodiment 31, wherein the (meth)acrylic functional additive is present in amount of from 3% to 6% by weight relative to the overall weight of the composition.
33. The composition of any one of embodiments 1-32, wherein the (meth)acrylic functional additive is a first (meth)acrylic functional additive and further comprising a second (meth)acrylic functional additive having a glass transition temperature of from −60° C. to 25° C.
34. The composition of embodiment 33, wherein the second (meth)acrylic functional additive has a glass transition temperature of from −55° C. to 10° C.
35. The composition of embodiment 34, wherein the second (meth)acrylic functional additive has a glass transition temperature of from −50° C. to 0° C.
36. The composition of any one of embodiments 33-35, wherein the second (meth)acrylic functional additive has a weight average molecular weight of from 200,000 g/mol to 1,500,000 g/mol.
37. The composition of embodiment 36, wherein the second (meth)acrylic functional additive has a weight average molecular weight of from 300,000 g/mol to 900,000 g/mol.
38. The composition of embodiment 37, wherein the second (meth)acrylic functional additive has a weight average molecular weight of from 500,000 g/mol to 900,000 g/mol.
39. The composition of any one of embodiments 33-38, wherein the second (meth)acrylic functional additive is present in amount of from 0.5% to 10% by weight relative to the overall weight of the composition.
40. The composition of embodiment 39, wherein the second (meth)acrylic functional additive is present in amount of from 1% to 7% by weight relative to the overall weight of the composition.
41. The composition of embodiment 40, wherein the second (meth)acrylic functional additive is present in amount of from 2% to 4% by weight relative to the overall weight of the composition.
42. The composition of any one of embodiments 1-41, wherein the composition comprises a foamed composition.
43. The composition of embodiment 42, wherein the foamed composition comprises hollow glass microspheres.
44. The composition of any one of embodiments 1-43, wherein the adhesive composition is microphase-separated.
45. The composition of any one of embodiments 1-44, wherein the adhesive composition lacks any chemical crosslinking.
46. The composition of any one of embodiments 1-45, wherein the adhesive composition is a pressure-sensitive adhesive.
47. A tape comprising: a backing; and a pressure-sensitive adhesive disposed on the backing and comprised of the composition of any one of embodiments 1-46.
48. The tape of embodiment 47, wherein the backing comprises a foam.
49. The tape of embodiment 47 or 48, wherein the pressure-sensitive adhesive is a first pressure-sensitive adhesive and further comprising a second pressure-sensitive adhesive disposed on a side of the backing opposite that of first pressure-sensitive adhesive.
50. The tape of any one of embodiments 47-49, wherein the second pressure-sensitive adhesive comprises the same adhesive composition as that of the first pressure-sensitive adhesive.
51. A bonded assembly comprising: a substrate; and a pressure-sensitive adhesive layer disposed on the substrate and comprised of the composition of any one of embodiments 1-46.
52. The bonded assembly of embodiment 51, wherein the substrate comprises a low surface energy substrate.
53. The bonded assembly of embodiment 52, wherein the low surface energy substrate comprises a thermoplastic olefin.
54. The bonded assembly of embodiment 52 or 53, wherein the low surface energy substrate comprises a clear coat.
55. The bonded assembly of embodiment 52 or 53, wherein the low surface energy substrate comprises a plurality of protruding ribs.
56. The bonded assembly of any one of embodiments 51-53, wherein the substrate comprises an electrical wire, wire harness, or combination thereof
57. The bonded assembly of any one of embodiments 51-56, wherein the bonded assembly lacks any primer layer between the substrate and the pressure-sensitive adhesive layer.
58. A method of making a bonded assembly, the method comprising: heating the composition of any one of embodiments 1-46 to a temperature sufficient to obtain a polymer melt; disposing the polymer melt onto a substrate; and cooling the polymer melt and the substrate to induce microphase separation of the composition and obtain the bonded assembly.
59. The method of embodiment 58, wherein the substrate comprises a plurality of protruding ribs.
60. The method of embodiment 58 or 59, wherein the substrate comprises a low surface energy surface.
61. A method of making a packaged adhesive, the method comprising: heating the composition of any one of embodiments 1-46 to a temperature sufficient to obtain a polymer melt; disposing the polymer melt onto a release surface; and cooling the polymer melt and substrate to induce microphase separation of the composition and obtain the packaged adhesive.
62. The method of embodiment 61, wherein the release surface has a topologically structured surface whereby the composition displays a complementary topologically structured surface when peeled away from the release surface.
63. The method of any one of embodiments 58-62, wherein the polymer melt is disposed onto the substrate or release surface according to a pre-determined pattern.
64. The method of embodiment 63, wherein the pre-determined pattern comprises a discontinuous pattern.
65. The method of any one of embodiments 58-64, wherein the composition is smoothed, embossed, or otherwise shaped after being disposed onto a release surface or the substrate.
66. The method of embodiment 65, wherein a heated tool is used to smooth, emboss, or otherwise shape the composition after the composition is microphase separated.
67. The method of any one of embodiments 58-66, wherein the polymer melt is disposed onto the substrate or release surface in a layer that varies in thickness.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

TABLE 1

| Materials | |
|---|---|
| IOA | Isooctyl acrylate, obtained from 3M Company, St. Paul, MN |
| AA | Acrylic acid, available from BASF Corporation, Florham Park, NJ |
| BA | Butyl acrylate, available from BASF Corporation, Florham Park, NJ |
| IBOA | Isobornyl acrylate, available from Chempoint, a Univar Company, Calumet City, IL |
| IOTG | Isooctylthioglycolate, available from Showa Denko Corporation Tokyo, Japan |
| D1161 | A styrene-isoprene-styrene triblock copolymer having an approximate styrene content of 15% and 19% diblock content, available under the trade designation KRATON D1161 P from Kraton Performance Polymers, Houston, TX |
| D1118 | A styrene-butadiene-styrene triblock copolymer having an approximate styrene content of 33% and 78% diblock content, available under the trade designation KRATON D1118 from Kraton Performance Polymers, Houston, TX |
| D1113 | A styrene-isoprene-styrene triblock copolymer having an approximate styrene content of 16% and 55% diblock content, available under the trade designation KRATON D1113 from Kraton Performance Polymers, Houston, TX |
| S1205 | A linear random-block styrene-butadiene copolymer having 25% styrene content, 17.5% present as a polystyrene block; available under the trade name SOLPRENE S-1205 from Dynasol, Houston, TX |
| DK11 | A styrene-butadiene copolymer available under the trade designation K-RESIN DK11, from Ineos Styrolution, Aurora, IL |
| SA120 | A low molecular weight oligomer based on polyphenylene ether with a glass transition temperature of 165 degrees Celsius, and a number average molecular weight of 2350 grams per mole, available under the trade designation of SA90 from SABIC, Riyadh, Saudi Arabia |
| SA90 | A low molecular weight oligomer based on polyphenylene ether with a glass transition temperature of 140 degrees Celsius, and a number average molecular weight of 1600 grams per mole, available under the trade designation of SA90 from SABIC, Riyadh, Saudi Arabia |
| P140 | A fully hydrogenated hydrocarbon resin with a softening point of 140° C., available under the trade designation ARKON P140 from Arakawa, Osaka, Japan |
| K5140 | A hydrocarbon resin made from a mixture of purified styrenic monomers with softening point of 140° C. and weight average molecular weight ($M_w$) of 4650 Daltons, available under the trade designation KRISTALEX 5140 from Eastman Chemical Company, Kingsport, TN |
| T130 | A hydrogenated terpene resin with softening point of 150° C., available under the trade designation CLEARON P150 from Yasuhara Chemical Company, Limited, Hiroshima, Japan |
| E160 | A thermoplastic resin made from purified aromatic hydrocarbon monomers with a glass transition temperature of 110 degrees Celsius, available under the trade designation ENDEX 160 from Eastman Chemical Company, Kingsport, TN |
| NEV240 | A thermoplastic low molecular weight, C9 hydrocarbon resin with a softening point of 136 degrees Celsius. Available under the trade designation NEVCHEM 240, from Neville Chemical Corporation, Pittsburgh, PA |
| C157 | A thermoplastic low molecular weight, hydrocarbon resin produced from indene and other aromatic monomers, with a softening point of 157 degrees Celsius. Available under the trade designation CUMAR 157, from Neville Chemical Corporation, Pittsburgh, PA |
| SX100 | A tackifying resin made from pure styrene with a softening point of 100 degrees Celsius, available under the trade designation YS RESIN SX100, from Yasuhara Chemical Company, Limited, Hiroshima, Japan |
| TN170 | A hydrocarbon resin based on selected constituents of petroleum-derived C9-fraction, with a softening point of 170 degrees Celsius, available under the trade designation TN170 from RÜTGERS Novares GmbH, Duisburg, Germany |

TABLE 1-continued

| Materials | |
|---|---|
| LBR361 | A butadiene homopolymer with glass transition temperature of −49 degrees Celsius, available under the trade designation of LBR-361 from Kuraray America, Incorporated, Houston, TX |
| EVA-CB | A pelletized ethyl vinyl acetate containing carbon black at a concentration of 40 wt %, available under the trade designation REMAFIN BLACK EVA 40%, from Clariant Corporation, Holden, MA |
| DAR1173 | 2-Hydroxy-2-methyl-1-phenyl-propan-1-one, a photoinitiator available under the trade designation DAROCUR 1173 from BASF Corporation, Florham Park, NJ |
| IRG651 | 2-dimethoxy-2-phenylacetophenone, a photoinitiator available under the trade designation IRGACURE 651 from available from BASF Corporation, Florham Park, NJ |
| IRG1010 | Pentaerythritoltetrakis(3-(3,5-ditertbutyl-4-hydroxyphenyl)propionate), an antioxidant available under the trade designation IRGANOX 1010, available from BASF Corporation, Florham Park, NJ |
| TPO | A high melt flow, mineral-filled thermoplastic elastomeric olefin (TEO) resin, available under the trade designation LYONDELL BASELL HIFAX TRC 779X from Standard Plaque Incorporated, Melvindale, MI |
| RELEASE LINER 1 | A 0.003 inch (76 micrometers) thick polyester release liner having a different release coating on each side to provide a differential release, available from 3M Company, Maplewood, MN |

Test Methods

90° Angle Peel Adhesion Strength

PSA test specimens, measuring 1.27 centimeters by 12.7 centimeters with approximately 1 mm thickness, were cut and the first Release Liner 1 was removed. Next, aluminum foil was laminated to the exposed adhesive surface using two passes of a 6.8 kilogram steel roller in each direction. The second Release Liner 1 was then removed from the adhesive to expose the second surface of the PSA. The exposed PSA surface was placed on a test panel of TPO, and rolled down using two passes of a 6.8 kilogram steel roller in each direction. The bonded samples were allowed to dwell for 24 hours at 25° C. and 50% humidity. The peel test was carried out using a tensile tester equipped with a 50 kiloNewton load cell at room temperature with a separation rate of 30.5 centimeters/minute. The average peel force was recorded and used to calculate the average peel adhesion strength in Newtons/centimeter. Peel adhesion strength values of 30 Newtons/centimeter or more are desirable.

Static Shear Strength

PSA test specimens measuring 2.54 cm×2.54 cm pieces, were cut and the first Release Liner 1 was removed. Next, an aluminum coupon was laminated to the exposed adhesive surface using 2 passes of a 6.8 kg steel roller in each direction. The second Release Liner 1 on the adhesive transfer tape was then removed. The exposed PSA surface was laminated to a test panel of either TPO (named as LYONDELL BASELL HIFAX TRC 779X) or aluminum, and rolled down using 2 passes of a 6.8 kg steel roller in each direction. The bonded samples were subjected to a dwell time of 24 hours at 25° C. and 50% relative humidity. The test panel was mounted vertically onto a hook in an 80° C. oven, and a 500 gram weight was attached to the first aluminum coupon. The hanging time at which the sample fell from the TPO or second aluminum substrate was recorded. The test was stopped after 10000 minutes if failure had not occurred by then. Static shear strength time of 8500 minutes or more are desirable.

Glass Transition Temperature ($T_g$)

The glass transition temperatures of the HTG and LTG Acrylic Copolymers (i.e., the first and second acrylic functional additives, respectively) were calculated using the Fox Equation:

$$1/T_g = \Sigma W_i/T_g i.$$

In this equation, $T_g$ is the glass transition temperature of the mixture, Wi is the weight fraction of component i in the mixture, and $T_g i$ is the glass transition temperature of component i, and all glass transition temperatures are in degrees Kelvin (K). The values used for each $T_g i$ were taken from a list provided by Sigma-Aldrich Corporation, St. Louis, MO Selected $T_g$ values are listed in Table 2 below.

TABLE 2

| Homopolymer | Tg (K) |
|---|---|
| Acrylic Acid | 378 |
| Butyl Acrylate | 219 |
| 2-Ethyl Hexyl Acrylate (2EHA) | 223 |
| Isobornyl Acrylate (IBOA) | 367 |
| Isooctyl Acrylate (IOA) | 223 |
| N,N-Dimethyl Acrylamide (NNDMA) | 362 |

Preparation of Polymodal Asymmetric Block Copolymer (PASBC)

A polymodal, asymmetric star block copolymer ("PASBC") was prepared according to U.S. Pat. No. 5,393,787, the subject matter of which is hereby incorporated by reference in its entirety. The polymer had a number average molecular weights of about 4,000 Daltons and about 21,500 Daltons for the two end blocks, 127,000-147,000 Daltons for the arm, and about 1,100,000 Daltons for the star measured by SEC (size exclusion chromatography) calibrated using polystyrene standards. The polystyrene content was between 9.5 and 11.5 percent by weight. The mole percentage of high molecular weight arms was estimated to be about 30%.

Preparation of Acrylic Copolymer (HTG-1, LTG-1)

Two sheets of a heat-sealable ethylene/vinyl acetate film having a vinyl acetate content of 6% and a thickness of 0.0635 millimeters (0.0025 inches) (VA24, from Consolidated Thermoplastics Co. of Schaumburg, IL) were heat sealed on their lateral edges and the bottom using a liquid form, fill, and seal machine to form a rectangular tube measuring 5 cm (1.97 inches) wide. The tube was then filled with one of the compositions shown in Table 1 to make Acrylic copolymers HTG-1 and LTG-1. The monomer amounts are reported in parts by weight (pbw) and IRG651, IOTG, and DAR1173 are reported in parts per 100 part of total monomer (pPh).

The filled tube was then heat sealed at the top and at periodic intervals along the length of the tube in the cross direction to form individual pouches measuring 18 cm by 5 cm, each containing 26 grams of composition. The pouches were placed in a water bath maintained between about 21° C. and 32° C., and exposed first on one side then on the opposite side to ultraviolet radiation at an intensity of about 4.5 milliWatts/square centimeter for 8.3 minutes to cure the composition. The radiation was supplied from lamps having about 90% of the emissions between 300 and 400 nanometers (nm), and a peak emission at 351 nm. Copolymers were produced and evaluated for $T_g$ and weight average molecular weights (MO. The results were as summarized in Table 3. The resulting pouch adhesive was used to prepare tape articles of the invention using a hot melt process.

TABLE 3

Compositions of HTG and LTG Acrylic Copolymers

| Polymers | IOA (pbw) | BA (pbw) | IBOA (pbw) | AA (pbw) | IRG651 (pph) | IOTG (pph) | DAR1173 (pph) | Mw (g/mol) | $T_g$ (° C.) |
|---|---|---|---|---|---|---|---|---|---|
| HTG-1 | 0 | 0 | 97 | 3 | 0 | 0.75 | 0.15 | 35,000 | 94 |
| LTG-1 | 45 | 45 | 0 | 10 | 0.15 | 0.06 | 0 | 800,000 | −43 |

Example 1

The PSA of Example 1 was prepared using the composition shown in Table 4 (below). All amounts shown are given in parts by weight (pbw). The materials were compounded using a co-rotating twin screw mixer, and subjected to 200 rotations per minute mixing (rpm) for three minutes. The mixer and die temperatures were set to 170 degrees Celsius. After mixing, the PSA was melt pumped via gear pump and hose through a slot die, with approximate thickness of 1 millimeter. The PSA was cast onto the tight side of Release Liner 1. The low release side of a second piece of Release liner 1 was then laminated to the exposed adhesive surface of the transfer tape. The collected PSA was then evaluated for Peel Adhesion Strength and Shear Strength as described in the test methods above. The results were as summarized in Table 6 below.

Examples 2-6

Example 1 was repeated with the following modifications. The compositions were prepared using the materials shown in Table 4. The PSAs were then evaluated for Peel Adhesion Strength and Shear Strength as described in the test methods above. The results were as summarized in Table 6 below.

Comparative Examples C1-C7

Example 1 was repeated with the following modifications. The compositions were prepared using the materials shown in Table 5. The resulting PSAs were then evaluated for Peel Adhesion Strength and Shear Strength as described in the test methods above. The results were as summarized in Table 6 below.

Results

Examples 1 to 6 exhibited improved performance over the comparative examples. The Examples maintained both high peel strength and shear strength values. In the comparatives, using the conventional (non-PPE) end block tackifiers or the absence of HTG resulted in either a lack of peel strength or lack of shear strength performance.

TABLE 4

| | Waid161 (pbw) | PASBC (pbw) | Waid118 (pbw) | Waid113 (pbw) | DK11 (pbw) | P140 (pbw) | HTG-1 (pbw) | S1205 (pbw) | SA90 (pbw) | SA120 (pbw) | T130 (pbw) | LBR361 (pbw) | IRG1010 (pbw) | EVA-CB (pbw) | LTG-1 (pbw) |
|---|---|---|---|---|---|---|---|---|---|---|---|---|---|---|---|
| E1 | 34 | 8 | 5 | 0 | 4 | 28 | 6 | 0 | 0 | 7 | 0 | 3 | 1.5 | 0.5 | 3 |
| E2 | 28 | 7 | 0 | 0 | 4 | 28 | 6 | 7 | 7 | 0 | 5 | 3 | 1.5 | 0.5 | 3 |
| E3 | 29 | 8 | 0 | 10 | 4 | 28 | 6 | 0 | 7 | 0 | 0 | 3 | 1.5 | 0.5 | 3 |
| E4 | 33 | 8 | 0 | 10 | 4 | 28 | 6 | 0 | 3 | 0 | 0 | 3 | 1.5 | 0.5 | 3 |
| E5 | 29 | 8 | 0 | 10 | 4 | 28 | 6 | 0 | 0 | 7 | 0 | 3 | 1.5 | 0.5 | 3 |
| E6 | 26 | 8 | 0 | 10 | 4 | 25 | 6 | 0 | 7 | 0 | 6 | 3 | 1.5 | 0.5 | 3 |

TABLE 5

Compositions of Comparative Examples 1 to 7

|    | D1161 (pbw) | PASBC (pbw) | D1118 (pbw) | D1113 (pbw) | DK11 (pbw) | P140 (pbw) | HTG-1 (pbw) | SA90 (pbw) | K1540 (pbw) | E160 (pbw) |
|----|-------------|-------------|-------------|-------------|------------|------------|-------------|------------|-------------|------------|
| C1 | 29 | 8  | 0 | 10 | 4 | 28 | 6 | 0 | 7 | 0 |
| C2 | 29 | 8  | 0 | 10 | 4 | 28 | 6 | 0 | 0 | 7 |
| C3 | 29 | 8  | 0 | 10 | 4 | 28 | 6 | 0 | 0 | 0 |
| C4 | 29 | 8  | 0 | 10 | 4 | 28 | 6 | 0 | 0 | 0 |
| C5 | 20 | 10 | 0 | 16 | 4 | 28 | 6 | 0 | 0 | 0 |
| C6 | 36 | 10 | 6 | 0  | 4 | 28 | 7 | 0 | 0 | 0 |
| C7 | 40 | 8  | 5 | 0  | 4 | 28 | 0 | 7 | 0 | 0 |

|    | NEV240 (pbw) | C157 (pbw) | SX100 (pbw) | TN170 (pbw) | LBR361 (pbw) | IRG1010 (pbw) | EVA-CB (pbw) | LTG-1 (pbw) |
|----|--------------|------------|-------------|-------------|--------------|----------------|--------------|-------------|
| C1 | 0 | 0 | 0 | 0 | 3 | 1.5 | 0.5 | 3 |
| C2 | 0 | 0 | 0 | 0 | 3 | 1.5 | 0.5 | 3 |
| C3 | 7 | 0 | 0 | 0 | 3 | 1.5 | 0.5 | 3 |
| C4 | 0 | 7 | 0 | 0 | 3 | 1.5 | 0.5 | 3 |
| C5 | 0 | 0 | 8 | 0 | 3 | 1.5 | 0.5 | 3 |
| C6 | 0 | 0 | 0 | 7 | 0 | 1.5 | 0.5 | 3 |
| C7 | 0 | 0 | 0 | 0 | 3 | 1.5 | 0.5 | 3 |

TABLE 6

Peel Adhesion Strength and Shear Strength Results of Examples and Comparatives

|    | Thickness (mm) | Peel Adhesion Strength (TPO) (N/cm) | Static Shear Strength (Aluminum) (mins) | Static Shear Strength (TPO) (mins) |
|----|----------------|-------------------------------------|------------------------------------------|-------------------------------------|
| E1 | 1.2 | 38.5 | 10000 | 10000 |
| E2 | 0.9 | 40.3 | 10000 | 10000 |
| E3 | 1.2 | 44.9 | 10000 | 8582  |
| E4 | 0.8 | 43.8 | 10000 | 10000 |
| E5 | 1.0 | 44.7 | 10000 | 9357  |
| E6 | 1.0 | 35.3 | 10000 | 10000 |
| C1 | 0.8 | 41.8 | 5923  | 3515  |
| C2 | 0.9 | 36.5 | 2910  | 3100  |
| C3 | 1.1 | 38.6 | 329   | 306   |
| C4 | 1.0 | 44.5 | 401   | 374   |
| C5 | 0.8 | 29.6 | 386   | 429   |
| C6 | 1.6 | 16.2 | 1630  | 1669  |
| C7 | 1.1 | 11.7 | 10000 | 10000 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

What is claimed is:

1. An adhesive composition comprising:
   a block copolymer component comprising a midblock segment and a plurality of end block segments, each end block segment comprising polystyrene, the block copolymer component present in amount of from 30% to 60% by weight relative to the overall weight of the composition;
   a first (meth)acrylic functional additive having a glass transition temperature of from 50° C. to 160° C. and a second (meth)acrylic functional additive having a glass transition temperature of from −60° C. to 25° C., as determined by Differential Scanning calorimetry at a scan rate of +10° C. per minute, wherein the first (meth)acrylic functional additive has a weight average molecular weight of from 10,000 g/mol to 75,000 g/mol and the second (meth)acrylic functional additive has a weight average molecular weight of from 200,000 g/mol to 1,500,000 g/mol;
   a first tackifier compatible with the midblock segment and comprising a hydrocarbon; and
   a second tackifier compatible with the end block segments and comprising a polyphenylene ether.

2. The composition of claim 1, wherein the first tackifier has a softening point temperature of from 80° C. to 160° C.

3. The composition of claim 1, wherein the second tackifier has a softening point temperature of from 100° C. to 230° C.

4. The composition of claim 1, wherein the polyphenylene ether has a number average molecular weight of from 300 g/mol to 50,000 g/mol.

5. The composition of claim 1, wherein the block copolymer component comprises a mixture of two of more of styrenic diblock, styrenic triblock, and styrenic star block copolymers.

6. The composition of claim 1, wherein the composition comprises a foamed composition.

7. The composition of claim 6, wherein the foamed composition comprises hollow glass microspheres.

8. A tape comprising:
   a backing; and
   a pressure-sensitive adhesive disposed on the backing and comprised of the composition of claim 1.

9. A bonded assembly comprising:
   a substrate; and
   a pressure-sensitive adhesive layer disposed on the substrate and comprised of the composition of claim 1.

10. The bonded assembly of claim 9, wherein the substrate comprises a low surface energy substrate.

11. A method of making a bonded assembly, the method comprising:
    heating the composition of claim 1 to a temperature sufficient to obtain a polymer melt; disposing the polymer melt onto a substrate; and cooling the polymer melt and the substrate to induce microphase separation of the composition and obtain the bonded assembly.

12. A method of making a packaged adhesive, the method comprising:

heating the composition of claim 1 to a temperature sufficient to obtain a polymer melt;

disposing the polymer melt onto a release surface; and cooling the polymer melt and release surface substrate to induce microphase separation of the composition and obtain the packaged adhesive.

* * * * *

UNITED STATES PATENT AND TRADEMARK OFFICE
CERTIFICATE OF CORRECTION

| | | |
|---|---|---|
| PATENT NO. | : 12,031,063 B2 | Page 1 of 1 |
| APPLICATION NO. | : 17/051330 | |
| DATED | : July 9, 2024 | |
| INVENTOR(S) | : Thomas Q Chastek | |

It is certified that error appears in the above-identified patent and that said Letters Patent is hereby corrected as shown below:

In the Claims

<u>Column 28</u>
Line 43, Claim 5, delete "two of more" and insert -- two or more --, therefor.

Signed and Sealed this
Nineteenth Day of November, 2024

Katherine Kelly Vidal
*Director of the United States Patent and Trademark Office*